United States Patent [19]

Bartky et al.

[11] Patent Number: 4,742,365

[45] Date of Patent: May 3, 1988

[54] INK JET APPARATUS

[75] Inventors: W. Scott Bartky, Chicago; A. John Michaelis, Glen Ellyn, both of Ill.

[73] Assignee: AM International, Inc., Chicago, Ill.

[21] Appl. No.: 855,131

[22] Filed: Apr. 23, 1986

[51] Int. Cl.[4] .............. G01D 15/16

[52] U.S. Cl. .............. 346/140 R; 310/328; 310/367

[58] Field of Search .............. 346/140; 310/800, 328, 310/367

[56] References Cited

U.S. PATENT DOCUMENTS

| | | | |
|---|---|---|---|
| 4,002,230 | 1/1977 | Schweppe et al. . | |
| 4,056,742 | 11/1977 | Tibbetts | 310/800 X |
| 4,158,847 | 6/1979 | Heinzl et al. . | |
| 4,282,532 | 8/1981 | Markham . | |
| 4,313,684 | 2/1982 | Tazaki et al. . | |
| 4,379,246 | 4/1983 | Guntersdorfer et al. . | |
| 4,415,909 | 11/1983 | Italiano et al. . | |
| 4,418,354 | 11/1983 | Perduijn . | |
| 4,418,356 | 11/1983 | Reece . | |
| 4,437,101 | 3/1984 | Ebi et al. . | |
| 4,504,844 | 3/1985 | Ebi et al. . | |
| 4,528,575 | 7/1985 | Matsuda et al. . | |
| 4,536,097 | 8/1985 | Nilsson | 400/126 |
| 4,539,570 | 9/1985 | Moore | 346/75 |
| 4,547,785 | 10/1985 | Jones | 346/75 |
| 4,570,098 | 2/1986 | Tomita | 310/328 X |
| 4,584,590 | 4/1986 | Fischbeck | 346/140 |
| 4,588,998 | 5/1986 | Yamamuro | 346/140 |
| 4,599,628 | 7/1986 | Doring | 346/140 |
| 4,605,939 | 8/1986 | Hubbard | 346/140 |

FOREIGN PATENT DOCUMENTS

| | | |
|---|---|---|
| 2256667 | 6/1974 | Fed. Rep. of Germany . |

*Primary Examiner*—Joseph W. Hartary
*Attorney, Agent, or Firm*—Nicholas A. Camasto; John R. Hoffman

[57] ABSTRACT

In an ink jet print head wherein a plurality of pumping chambers are provided for receiving ink and individually discharging the ink on demand in droplet form. The pumping chambers are formed on a substrate and defined in part by a continuous film of piezoelectric material extending over the substrate. Electrodes are electrically coupled on opposite sides of the piezoelectric film and positioned to define a plurality of distinct, electrically pulsed ink droplet drive elements operatively associated individually with the plurality of pumping chambers. An orifice for each chamber causes ink to be ejected from the chamber in response to demand electrical pulsation of the drive element for the respective chamber.

2 Claims, 4 Drawing Sheets

FIG. 1
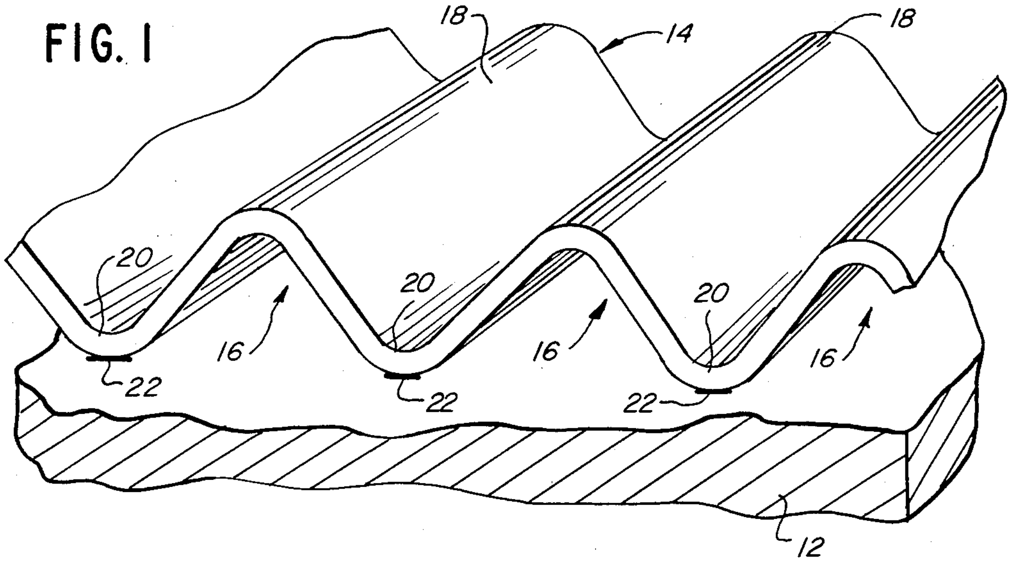
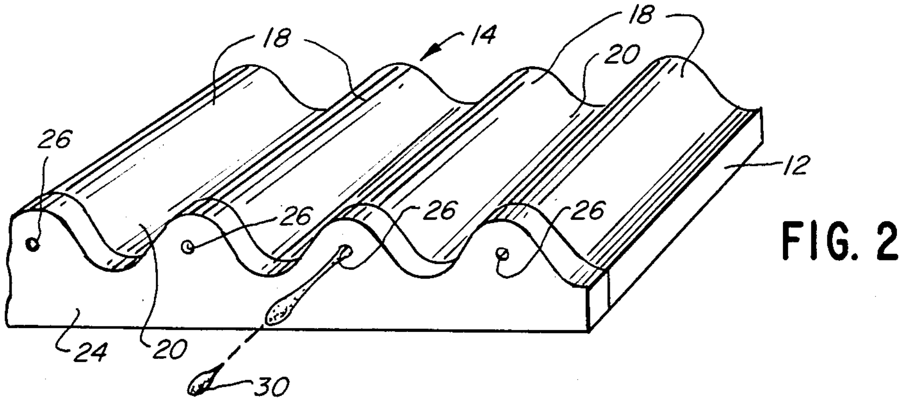
FIG. 2
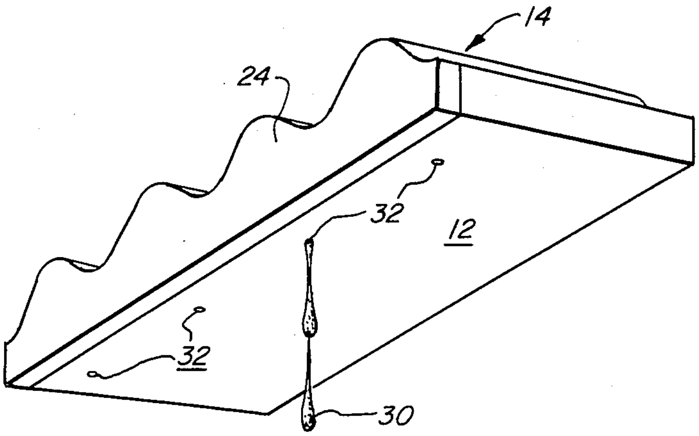
FIG. 3

FIG. 4
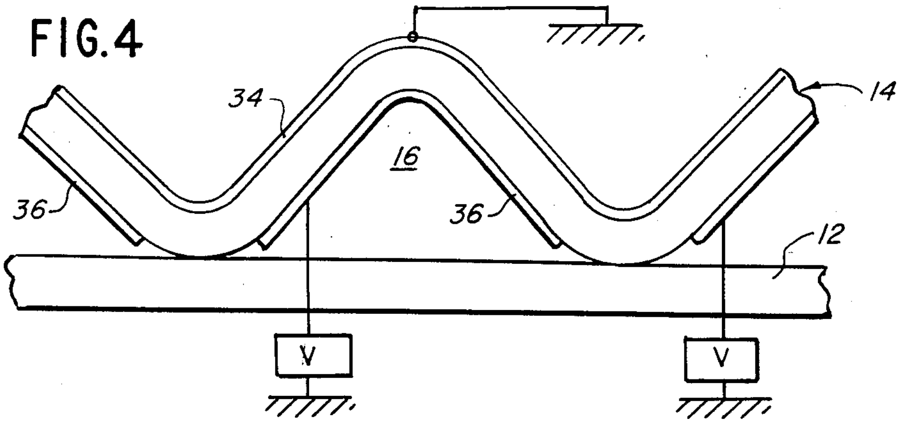
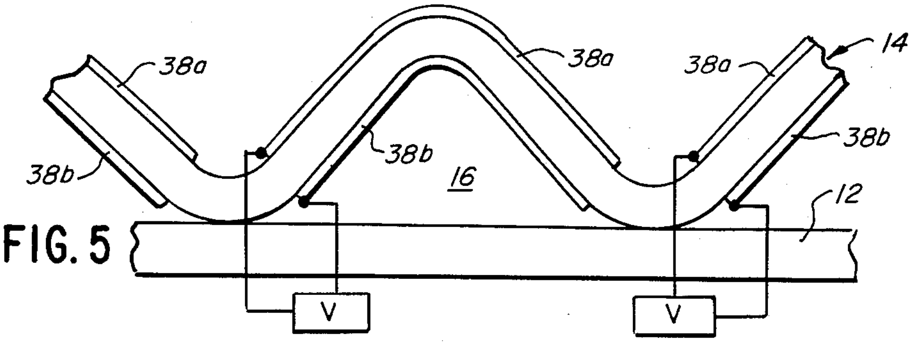
FIG. 5
FIG. 6
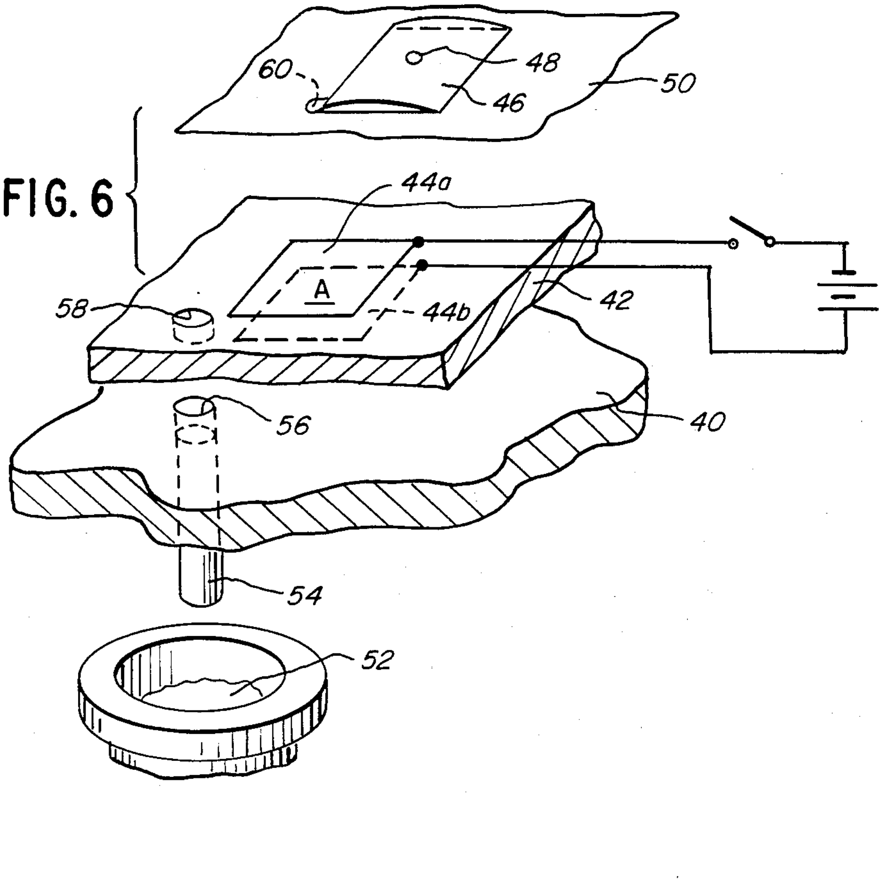

INK JET APPARATUS

BACKGROUND OF THE INVENTION

This invention generally relates to non-impact printing and, in particular, to high speed printing using a plurality of electrically controlled liquid ink jets.

In an ink jet printer, the print head structure may be a multiple nozzle type, with the nozzles aligned in a vertical line and supported on a print head carriage which is caused to be moved or driven in a horizontal direction for printing in a line manner. The ink droplet drive elements or transducers may be positioned in a circular configuration with ink passageways leading to the nozzles. Alternatively, the printer head structure may include a plurality of equally spaced horizontally aligned single nozzle print heads which are caused to be moved back and forth horizontally to print successive lines of dots making up the lines of characters. In this latter arrangement, the drive elements or transducers are individually supported along a line of printing.

There are a number of ways to generate an ink droplet. This invention is concerned with piezoelectric transducers as the drive elements. Heretofore, most such devices have been manufactured as single jets and then assembled into arrays. The single jets are operated to eject droplets on demand in contrast to creating droplets from a continuous jet where the piezoelectric device simply is used as a modulating drive means. Such continuous ink jet systems require special apparatus for deflecting the droplets and collecting the ink that is not destined for the printing medium. This invention is not concerned with continous ink jet systems.

The resolution of the printing system is generally measured in "dots per inch". In ink jet systems, a high resolution requires close spacing of the jets. Manufacturing single jet devices assembled into arrays is costly, particularly for heads containing a large number of jets. While print heads comprising arrays of single jets have been manufactured using standard piezoelectric crystals, they suffer from several disadvantages. Specifically, since piezoelectric crystals are brittle and must themselves be grown from crystals, they require careful handling in production. More importantly, these characteristics limit the minimum thickness and maximum size of the crystals. Another major factor in using piezoelectric crystals is that their dielectric breakdown limits the voltage that can safely be applied. As a result of these physical properties, the number of jets that can be assembled or placed in a given area is limited. Present constructions would require the stacking of several head assemblies.

Examples of prior ink jet print heads using piezoelectric crystals or like transducers are shown in U.S. Pat. Nos. 4,415,909 to Italiano et al, dated Nov. 15, 1983; 4,418,354 to Perduijn, dated Nov. 29, 1983 and 4,418,356 to Reece, dated Nov. 29, 1983.

Another form of ink printing device using a piezoelectric drive element is shown in U.S. Pat. No. 4,379,246 to Guntersdorfer, dated Apr. 5, 1983, wherein a piezoelectric drive element surrounds an ink channel of a writing jet in a mosaic printing device. The drive element is a winding formed by plies of thin synthetic foil having piezoelectric properties. In this apparatus, the foil is cut into individual pieces. U.S. Pat. No. 4,282,532 to Markham, dated Aug. 4, 1981, shows an ink jet apparatus using a thin film piezoelectric exciter for drop generation. However, the piezoelectric film is used in a continuous jet apparatus for modulation purposes.

It would be quite advantageous if multiple individual jets could be built on a common substrate with very close spacing, to yield a high dot per inch resolution capability not heretofore available. This invention is directed to satisfying this and other needs and solving problems with prior ink jet printing heads or the like.

SUMMARY OF THE INVENTION

An object, therefore, is to provide a new and improved non-impact printing device using electrically controlled liquid ink jets provided by a continuous transducer film, such as of piezoelectric material.

Generally, the invention is incorporated in an ink jet print head or the like, wherein a plurality of pumping chambers are provided for receiving ink and individually discharging the ink on demand in droplet form. A generally rigid substrate is provided, and a plurality of the pumping chambers are formed on the substrate and defined in part by a continuous film of piezoelectric material extending over the substrate. Electrode means are electrically coupled on opposite sides of the piezoelectric film and positioned to define a plurality of distinct, electrically pulsed ink jet drive elements operatively associated individually with the plurality of pumping chambers. Nozzle means are provided for each chamber to cause ink to be ejected from the chamber in response to demand electrical pulsation of the drive element for the respective chamber.

In one embodiment of the invention, the rigid substrate is generally planar, and the piezoelectric film is formed in a generally corrugated shape providing peaks spaced from the substrate and cooperating therewith to define a plurality of elongated pumping chambers. The alternating valleys of the corrugated shape formed by the piezoelectric film are fixed and sealed to the substrate. The nozzle means may be formed either through the substrate or by orifice means formed at the ends of the elongated chambers. With the continuous film, continuous electrode means may be provided on one side of the film in common with all pumping chambers. Individual electrode means are provided on the opposite side of the film for each respective pumping chamber formed by the corrugated shape of the piezoelectric film.

In another form of the invention, the rigid substrate again is generally planar, but the continuous film of piezoelectric material extending over the substrate also is planar and positioned onto the substrate in a flat state. Means are provided defining a plurality of orifice members cooperating with the piezoelectric film to define an array of pumping chambers. Electrode means are electrically coupled on opposite sides of the piezoelectric film coincident with each orifice member to define a plurality of electrically pulsed ink droplet drive elements operatively associated individually with the plurality of pumping chambers. Preferably, the plurality of orifice members are formed as portions of a continuous orifice plate extending over the continuous piezoelectric film. The film may be bonded to the substrate at locations spaced from and about the electrode means.

The second embodiment described above readily lends itself to stacking layers of piezoelectric film in juxtaposition, each having the electrode means therefor coincident with the respective orifice member which defines the respective pumping chamber. Such stacking either can be used to increase the effective excitation volume of a given size pumping chamber or reduce the size of the pumping chamber for a given volume of ejected ink. The electrode means for each layer of piezoelectric film is connected in parallel with the electrode means of other layers.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a fragmented perspective view of a first embodiment of an ink jet device, primarily illustrating the substrate and corrugated piezoelectric film;

FIG. 2 is a perspective view of the device of FIG. 1, illustrating ink ejecting orifice means at the end of each elongated pumping chamber;

FIG. 3 is a perspective view somewhat similar to that of FIG. 2, illustrating orifice means for ejecting ink droplets directly through the substrate;

FIGS. 4 and 5 illustrate alternate methods of connecting the electrode means to the corrugated piezoelectric film;

FIG. 6 is a fragmented perspective view of a second embodiment of the invention using a continuous piezoelectric film;

DETAILED DESCRIPTION OF THE PREFERRED EMBODIMENT

Figure 7:
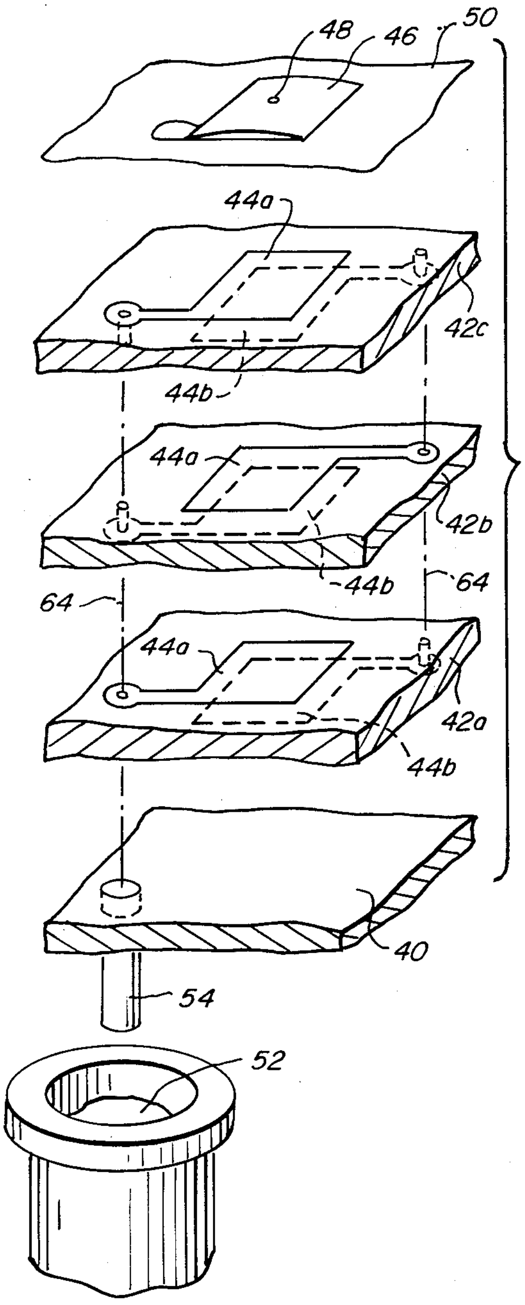
FIG. 7 is a perspective view similar to that of FIG. 6, illustrating a plurality of layers of juxtaposed piezoelectric film.

Initially, it should be noted that the invention generally is directed to providing a piezoelectric print head. Somewhat recently, piezoelectric plastics have become available and most often are used in a wide variety of applications ranging from headphones and speakers to ultrasonic transducers. Unlike piezoelectric crystals which are used in most conventional ink jet print heads, piezoelectric plastics may be manufactured in films as thin as a few microns. Although such piezoelectric films may not be quite as sensitive as piezoelectric crystals, the film base has a high dielectric breakdown strength and enables significantly higher driving voltages to be used. As a result, for a given physical size, more mechanical energy can be derived from a piezoelectric film than from a crystal.

In carrying out the invention, two embodiments are disclosed herein and exemplified in FIGS. 1–5 and 6–10, respectively, of the drawings.

Referring to the drawings in greater detail, and first to FIG. 1, the invention is designed for an ink jet print head or the like, wherein a plurality of pumping chambers are provided for receiving ink and individually discharging the ink on demand in droplet form. A generally rigid, planar substrate 12 is provided. The substrate may be of metallic, glass, plastic, epoxy or ceramic material. A continuous film, generally designated 14, of piezoelectric material extends over substrate 12 and cooperates therewith to define a plurality of pumping chambers, generally designated 16. The chambers result by forming piezoelectric film 14 in a generally corrugated shape having peaks 18 spaced from substrate 12 to form elongate pumping chambers 16. The corrugated shape of the piezoelectric film thereby defines valleys 20 which are continuously bonded, as at 22, to fix the piezoelectric film to the substrate and to provide a seal between adjacent pumping chambers.

Nozzle means are provided for each elongated pumping chamber 16 to cause ink to be ejected from the chamber in response to demand electrical pulsation of drive elements (described below) for the respective chambers. Specifically, FIG. 2 shows a method of edge ejection of the ink droplets by providing an end plate 24 with orifices 26 aligned with the pumping chambers for the ejection of ink droplets 30. End plate 24 may be fabricated of a wettable material, such as electroformed nickel.

FIG. 3 shows a method of ejecting ink droplets 30 directly through substrate 12 by means of nozzles or orifices 32 in communication with side portions of the respective pumping chambers 16.

Referring to FIGS. 4 and 5, the continuous film 14 of piezoelectric material is electrically coupled to define a plurality of electrically pulsed ink droplet drive elements operatively associated individually with the plurality of pumping chambers described above. FIG. 4 shows a continuous electrode 34 on one side (the top side as illustrated) of piezoelectric film 14. This electrode is common to all ink jets or pumping chambers 16. Individual electrodes 36 are provided on the opposite side of film 14 and are individual to each of the pumping chambers 16.

FIG. 5 illustrates individual electrodes **38*a* and 38*b* for each respective ink jet or pumping chamber 16, in contrast to the use of a common electrode 34 for all jets as described in relation to FIG. 4**.

In either eleotrode system as desoribed in relation to FIGS. 4 and 5, it should be noted that film 14 can be made in a variety of metalized surfaces. In particular, a coating of nickel is preferred because of its wetting properties. The metallized coating can be selectively removed, as by etching, to provide either system of electroconnection as illustrated by electrodes 34,36 in FIG. 4 and **38*a*,38*b* in FIG. 5**. This can be done either before or after forming the film into a corrugated shape or before or after bonding the corrugated film to the substrate.

A second embodiment of the invention utilizing continuous piezoelectric film is illustrated in FIGS. 6–10. Specifically, referring to FIG. 6, again a generally rigid, planar substrate 40 is provided, and a continuous film 42 of piezoelectric material extends over and is laid up upon the substrate. In this embodiment, rather than being corrugated, piezoelectric film 42 is generally planar and positioned on the top flat surface of substrate 40. Electrodes **44*a* and 44*b* are electrically formed or deposited on opposite sides of piezoelectric film 42**. The electrodes have a given area "A" and are shown generally as being square-shaped in FIG. 6. An orifice member 46 has nozzle means in the form of an ink droplet ejecting orifice 48 to provide a pumping chamber therebeneath. The orifice member is part of a continuous orifice plate 50 bonded to the piezoelectric film as will be apparent hereinafter. The orifice member and its resulting pumping chamber is substantially equal in planar area to the area "A" of electrodes 44a,44b. In other words, as will be seen, electrodes 44a, 44b and orifice plate 46 combine to form a single ink jet. The electrodes, being located on the film coincident with the orifice plate, define an electrically pulsed ink droplet drive element operatively associated with the respective pumping chamber defined by the orifice member, by using the area of piezoelectric film 42 sandwiched between the electrodes.

Ink is supplied to the pumping chamber defined by orifice member 46 from a supply 52, through a capillary tube 54, and through orifices 56 and 58 in substrate 40 and piezoelectric film 42, respectively, and into the pumping chamber through an unbonded portion 60 on the underside of orifice plate 50.

FIG. 7 shows a system by which the area of the drive element provided by the piezoelectric film can be reduced by stacking layers of film. Like numerals have been applied in FIG. 7 corresponding to like components described in relation to FIG. 6.

More particularly, a plurality of layers 42a,42b and 42c of piezoelectric film are stacked between substrate 40 and orifice plate 50. Electrodes 44a are connected in parallel, as at 62, and electrodes 44b are connected in parallel, as at 64. These connections can be made by techniques used in the fabrication of multi-layer printed circuit boards, for instance. Although each individual layer of piezoelectric film 42a–42c is shown possessing two electrodes, only one may be required, if the bond between films is very thin and/or has a higher permittivity than the film.

It will be appreciated that the electrical connections are a matter of choice. The criterion is that all the individual sections of piezoelectric film in a multi-layer jet move or deflect in the same direction upon excitation by the applied voltage.

From the foregoing, it can be understood that by stacking layers of piezoelectric film 42a–42c as illustrated in FIG. 7, the pumping effect on the pumping chamber provided by orifice member 46 is multiplied. All layers respond together, and in the same direction, in response to excitation. On the other hand, by using three layers of piezoelectric film as illustrated in FIG. 7, the area (e.g. "A" in FIG. 6) of a single piezoelectric jet can be reduced to one-third, and still eject the same droplet volume as a single layer of film three times the area. The number of ink jets that can be provided in any given planar area can be increased tremendously when significant numbers of layers of film, such as twenty-five, are used.

Figure 8:
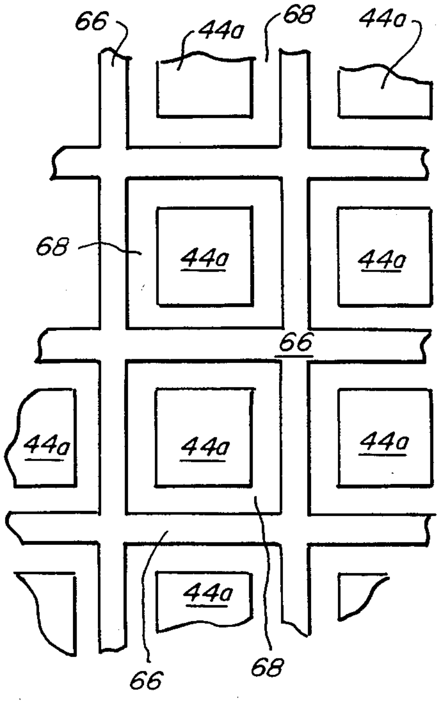
FIG. 8 is a somewhat schematic view illustrating the relative positioning of the electrode means and bonding lines between the piezoelectric film and the substrate shown in FIG. 6.

FIG. 8 illustrates, somewhat schematically, the location of a plurality of ink jets as represented by electrodes 44a in a given multi-jet planar array. In order that each "cell" or ink jet is independent from adjacent jets in the multi-jet planar array, it is necessary to rigidly bond the area between adjacent jets or cells. To this end, cross-areas 66 illustrate the outline of the rigid bonded attachment in a multi-layer multi-jet array. Areas 68 outside the active areas of electrodes 44a (44b) are free to expand and contract with the excitation action of the piezoelectric film.

Figure 10:
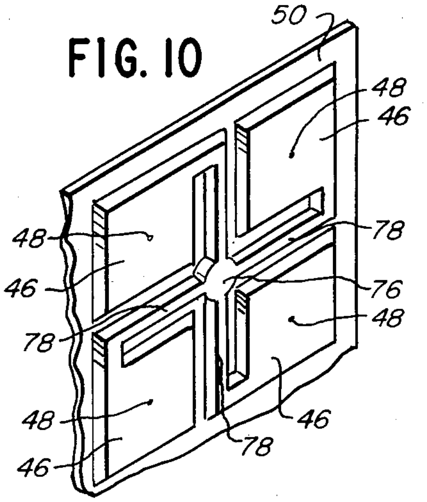
FIG. 10 is a fragmented perspective view of one of the clusters of pumping chambers shown in FIG. 9.
Figure 9:
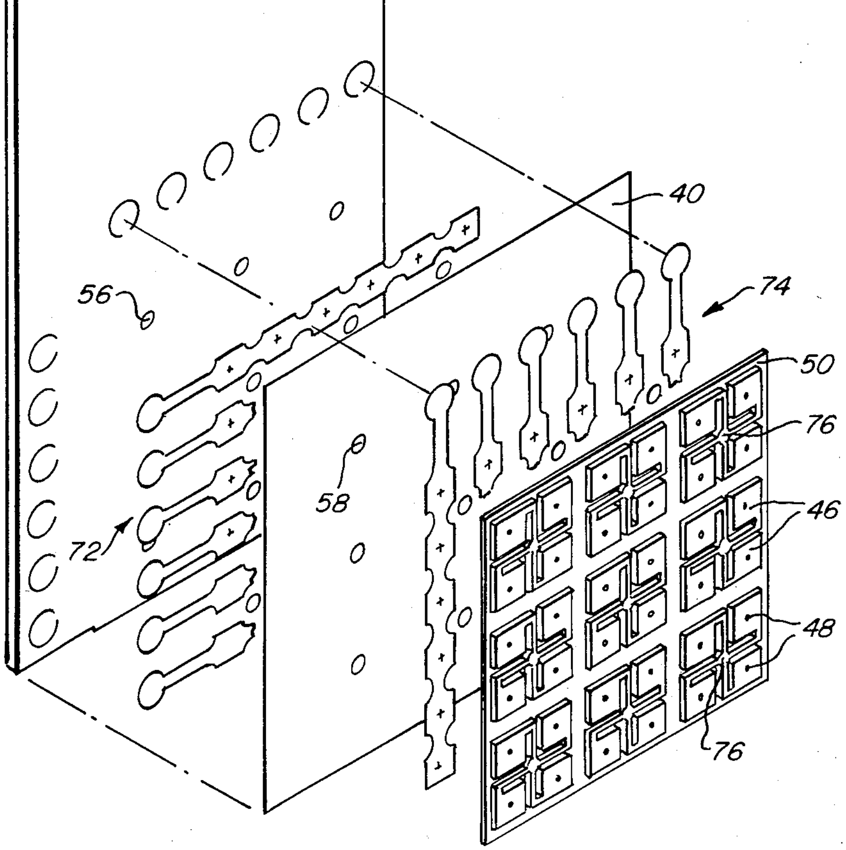
FIG. 9 is a perspective view of an alternate form of the second embodiment of the invention.

FIGS. 9 and 10 show the principles of the ink jet embodiment of FIGS. 6–8 in a planar multi-jet array, with the jets arranged in clusters, and also incorporating concepts of printed circuit board technology. As shown in FIG. 9, the substrate for an ink jet print head comprises a printed circuit board 70. Piezoelectric film 40 is sandwiched between the circuit board and orifice plate 50. Electrode means, generally designated 72 and corresponding to electrodes 44b (FIGS. 6 and 7), are vacuum deposited as a circuit network on the back surface of piezoelectric film 40. Similarly, electrode means 74, corresponding to electrodes 44a (FIGS. 6 and 7), are vacuum deposited on the front surface of piezoelectric film 40. Piezoelectric film layer 40 could be a multilayer composite.

Referring to FIG. 10 in conjunction with FIG. 9, it can be seen that orifice members 46 on orifice plate 50 are arranged in clusters of four, all joined to a common, central ink supply micro-chamber 76. The pumping chambers defined beneath orifice members 46 are in communication with supply chamber 76, in each cluster, by elongated ink conduits or capillaries 78. These capillaries resist rapid flow and thus provide an accumulation chamber means to effect damping of the ink flow and also to reduce interaction among the jets. As seen in FIG. 9, a number of such interconnected pumping chambers are supplied with ink through orifices 56 and 58 in substrate 70 and film 40, respectively, to supply the pumping chambers with ink from a source as described in relation to FIG. 6.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an ink jet print head or the like, wherein a plurality of pumping chambers are provided for receiving ink and individually discharging the ink on demand in droplet form, comprising:

a generally rigid substrate;

a plurality of juxtaposed layers of continuous film of piezoelectric material extending over the substrate;

a continuous orifice plate extending over said juxtaposed layers of continuous piezoelectric film and forming a plurality of orifice membes on the exposed side of the juxtaposed piezoelectric film layers and cooperating therewith to define an array of said plurality of pumping chambers; and each said layers of piezoelectric film having electrode means electrically coupled on opposite sides of the respective film coincident with a respective orifice member to define a plurality of electrically pulsed ink droplet drive elements operatively associated individually with said plurality of pumping chambers.

2. In an ink jet print head as in claim 1 wherein said electrode means for each layer of piezoelectric film are connected in parallel with the electrode means of all other layers.

* * * * *